US005651896A

United States Patent [19]
Nagl

[11] Patent Number: 5,651,896
[45] Date of Patent: Jul. 29, 1997

[54] SULFUR SEPARATION SYSTEM WITH INTERFACE CONTROL

[75] Inventor: Gary J. Nagl, Deer Park, Ill.

[73] Assignee: Wheelabrator Clean Air Systems Inc., Schaumburg, Ill.

[21] Appl. No.: 504,354

[22] Filed: Aug. 15, 1995

[51] Int. Cl.$^6$ .......................... B01D 17/032; C01B 17/02
[52] U.S. Cl. .................. 210/739; 23/308 S; 210/86; 210/114; 210/534; 210/800; 423/578.1
[58] Field of Search .................. 23/293 S, 308 S; 423/567.1, 578.1, 578.4; 210/86, 104, 112, 114, 512.1, 513, 533, 535, 744, 787, 788, 800, 87, 90, 103, 115, 741, 534, 739; 137/172, 590

[56] References Cited

U.S. PATENT DOCUMENTS

| | | | |
|---|---|---|---|
| 1,493,717 | 6/1924 | Coffin. | |
| 2,696,462 | 12/1954 | Bodkin | 210/112 |
| 3,306,446 | 2/1967 | Lewis | 210/114 |
| 3,443,692 | 5/1969 | Halsey | 210/114 |
| 3,689,229 | 9/1972 | Lane et al. | 23/308 S |
| 4,140,143 | 2/1979 | Fraudin et al. | 137/172 |
| 4,158,039 | 6/1979 | Ullrich | 422/262 |
| 4,206,181 | 6/1980 | Ullrich | 422/262 |
| 4,304,570 | 12/1981 | Kleeberg et al. | 210/114 |
| 4,730,369 | 3/1988 | Nagl et al. | 23/293 S |
| 4,876,079 | 10/1989 | Kliem et al. | 210/114 |
| 4,939,817 | 7/1990 | Weber | 23/308 S |
| 5,122,351 | 6/1992 | Hardison | 23/293 S |
| 5,516,423 | 5/1996 | Conoby et al. | 210/103 |

FOREIGN PATENT DOCUMENTS

| | | | |
|---|---|---|---|
| 3621481A1 | 6/1986 | Germany. | |
| 4-180803 | 6/1992 | Japan | 210/112 |
| 861342 | 9/1981 | U.S.S.R. | 210/103 |
| 2018611 | 10/1979 | United Kingdom. | |

OTHER PUBLICATIONS

International Search Report mailed Mar. 6, 1996.

*Primary Examiner*—Joseph W. Drodge
*Attorney, Agent, or Firm*—McDonnell Boehnen Hulbert & Berghoff

[57] ABSTRACT

A liquid separator system for separating molten sulfur from liquid redox solution or reslurry water. The system includes a vessel with a top part and a bottom part. The vessel has a larger diameter at the top part than at the bottom part, and the cross section of the vessel downwardly decreases from the top part to the bottom part of the vessel. The system also includes an inlet for introducing a redox solution or reslurry water and molten sulfur, which is denser than redox solution or reslurry water, into the vessel. An outlet near the bottom part of the vessel allows a flow of the molten sulfur from the vessel. An interface control structure senses an interface level between the redox solution or reslurry water and the molten sulfur, and the interface control structure controls the flow of molten sulfur from the outlet. The interface control structure is adjusted to optimally alter the vertical height of the interface level within the vessel so that the residence time of the molten sulfur in the vessel does not decrease as the sulfur production throughput decreases, and so that the interface area of the molten sulfur and the redox solution is reduced as the sulfur throughput decreases.

23 Claims, 2 Drawing Sheets

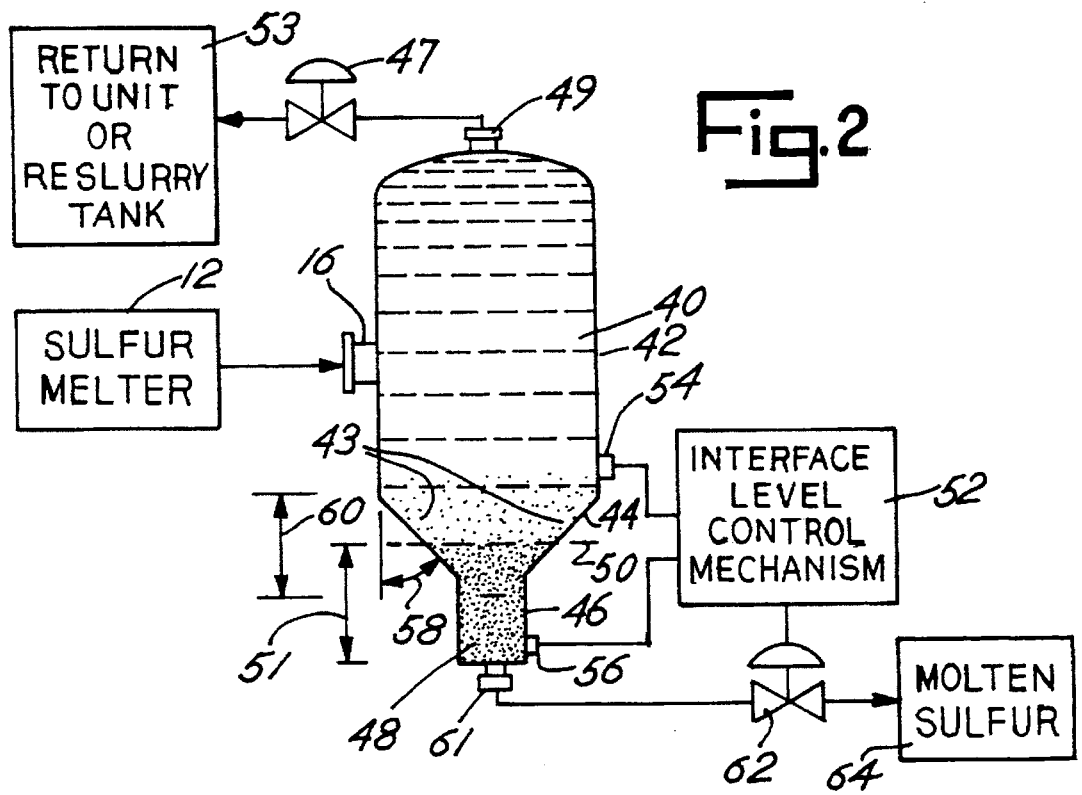
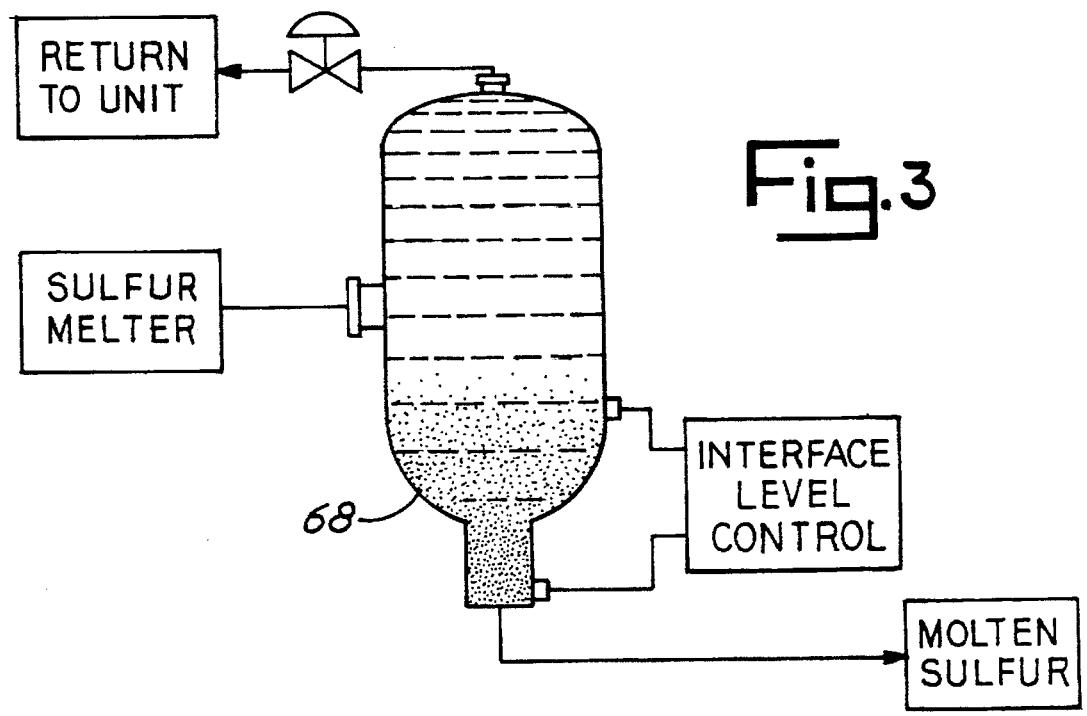

SULFUR SEPARATION SYSTEM WITH INTERFACE CONTROL

FIELD OF THE INVENTION

The present invention relates to an improved sulfur separation system for recovering sulfur from a liquid including both molten sulfur and redox solution.

BACKGROUND OF THE INVENTION

By-products of many redox processes include solid elemental sulfur suspended in a liquid redox solution. In some liquid redox processes, it is desirable and necessary to use a sulfur melter to melt the solid elemental sulfur to produce a high quality, marketable sulfur product. However, metallic ions in the redox solution, such as iron and vanadium, react with hydrosulfide, thiosulfate and bicarbonate ions, collectively called "reactive solutes," at elevated temperatures, forming metallic polysulfides. These metallic polysulfides are undesirable in the context of producing high quality elemental sulfur. The formation of a high quantity of metallic polysulfides may render the sulfur unusable.

The rate at which metallic ions react with sulfur is a function of the quantity of metallic ions in the redox solution, the melter temperature, the amount of time the sulfur is in contact with the redox solution at elevated temperatures, and the surface area of the interface between the molten sulfur and the redox solution. If more metallic ions are present in the solution, more polysulfides will be formed. As the melter temperature increases, the reaction activity between sulfur and metallic ions increases, forming more metallic polysulfides. As the contact time between the molten sulfur and the redox solution at high temperatures increases, more metallic polysulfides will be formed. The interface between the molten sulfur and the redox solution provides constant contact of the molten sulfur and the metallic ions. Thus, a smaller interface surface area between the molten sulfur and the redox solution will limit the formation of metallic polysulfides.

A filter/wash/reslurry system may be employed to reduce the metallic ions and reactive solutes entering the sulfur melter. Also, sulfur melters may be operated at the lowest possible temperature above the melting point of the sulfur. Although limiting the metallic ions and reactive solutes entering the melter via filtration and operating the melter at lower temperatures are effective techniques in improving sulfur quality, residence time and interface surface area also play significant roles in the formation of metallic polysulfides and consequently sulfur quality. Even when the melter temperature is maintained at the lowest possible level in conjunction with a filter/wash/reslurry system, sulfur quality will deteriorate when long residence times and large interface areas are employed.

With conventional sulfur separation designs, residence time is one of the least controllable variables affecting sulfur quality. Sulfur separators are generally designed to provide a specific sulfur residence time corresponding to the maximum sulfur throughput of the unit. As residence time increases beyond the time expected during maximum sulfur production, sulfur separation improves because the sulfur droplets have more time to separate from the redox solution. In addition, the interface level between the redox solution and the molten sulfur is more sharply defined, and thus interface level control is improved. However, as residence increases, the formation of polysulfides increases. Thus, an optimum residence time is generated based on a compromise between these considerations.

The flow of molten sulfur from conventional systems is controlled by maintaining the interface level at a certain vertical level. This level is determined based on a particular sulfur throughput of the unit. The level is maintained by opening and closing an outlet valve. Thus, when a system is operated at less than the design sulfur capacity, that is, when the sulfur throughput declines, the interface level is maintained at a constant height and the residence time of the sulfur increases. Although the separation of sulfur droplets may be improved in such a scenario, the quality of the sulfur decreases dramatically.

SUMMARY OF THE INVENTION

As illustrated by a preferred embodiment of the invention, to be described, the present invention, in a principal aspect, relates to a liquid separator system. The system includes a vessel with a top part and a bottom part. The vessel has a larger diameter at the top part than at the bottom part, and the cross section of the vessel downwardly decreases from the top part to the bottom part of the vessel. The system also includes an inlet for introducing two liquids, the second more dense than the first, into the vessel. An outlet near the bottom part of the vessel allows a flow of the denser liquid from the vessel. An interface control structure senses an interface level between the two liquids, and the interface control structure controls the flow of the denser liquid from the outlet. By adjusting the setpoint of the interface control structure, the vertical height of the interface level within the vessel can be optimally altered so that the residence time of the denser liquid in the vessel does not decrease as the throughput of the denser liquid decreases, and so that the interface area of the two liquids is reduced as the throughput decreases. In a particular embodiment of the invention, the system is used to separate molten sulfur from liquid redox solution or reslurry water.

It is thus an object of the present invention to improve the quality of sulfur recovered from a redox application. A further object of the invention is to provide a system where the residence time of molten sulfur in a sulfur separator can be varied according to sulfur throughput. Another object of the invention is an improved sulfur separation device that permits more precise interface level control while achieving the advantages of varying the interface surface area and residence time. Another object of the invention is a system that allows the interface area between the liquid redox solution or the reslurry water and the molten sulfur to be varied. A further object of the invention is an improved sulfur separation system that is adaptable for use with existing technology. Yet another object of the invention is a more cost effective method of recovering high quality elemental sulfur.

The features of the present invention may be better understood by considering the following detailed description of the invention. In the course of the description, reference is made to the attached drawings.

BRIEF DESCRIPTION OF THE DRAWINGS

FIG. 2 is a depiction of a preferred embodiment of the invention; and

FIG. 3 is a depiction of an alternate preferred embodiment of the invention.

DETAILED DESCRIPTION OF THE PREFERRED EMBODIMENT

Figure 1:
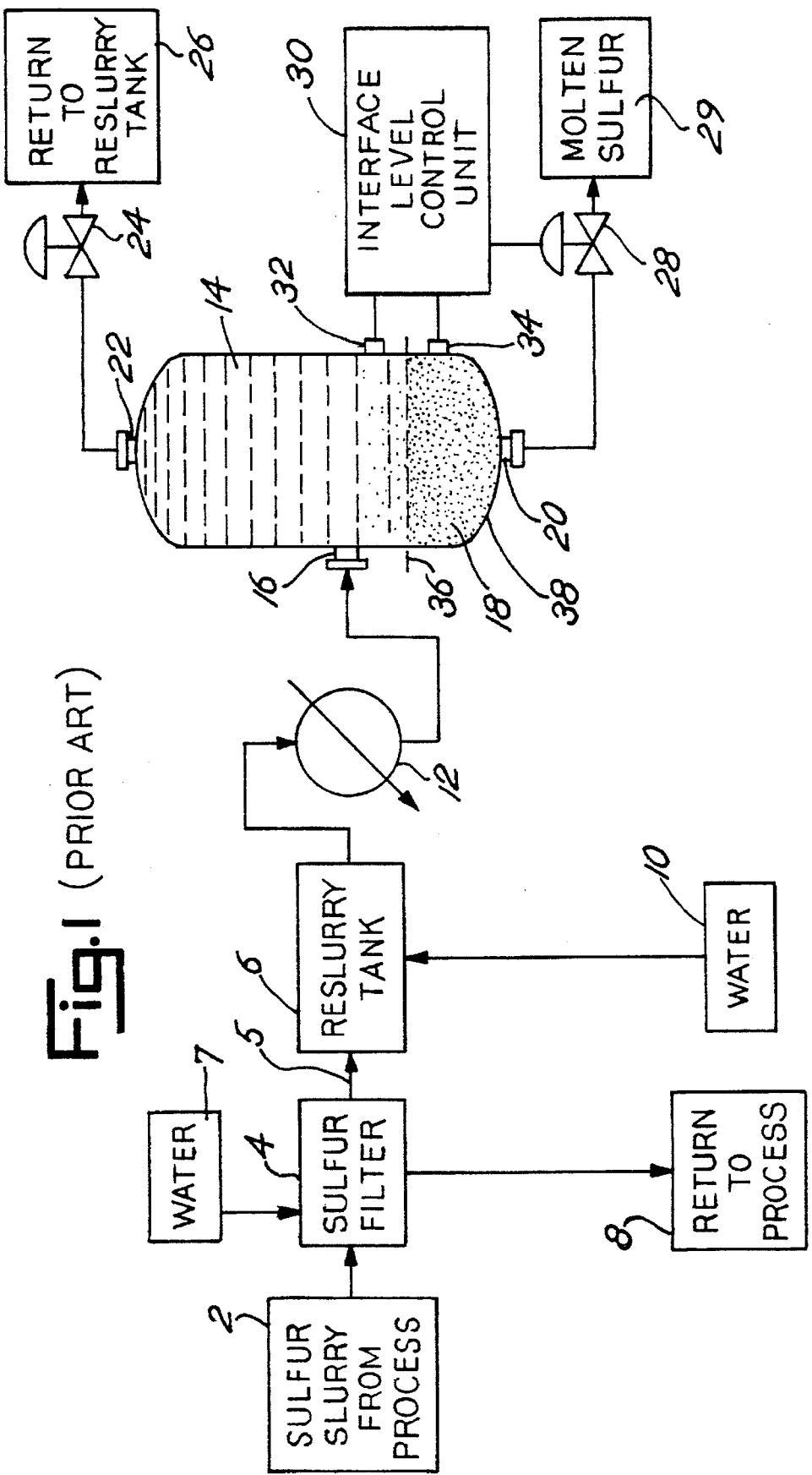
FIG. 1 is a schematic block diagram of a prior art method of removing elemental sulfur from slurry.

To establish the context of the invention, reference is made to FIG. 1, which depicts a prior art method of producing molten sulfur from a liquid redox process. Sulfur slurry from a liquid redox application, as shown at 2, which includes elemental solid sulfur suspended in redox solution, is passed through a sulfur filter 4. The slurry can be either a relatively concentrated slurry (approximately 15 wt%) as would be produced in a concentrating device, such as a settling vessel, or a relatively dilute slurry (0.1 wt%) as would be encountered if no concentrating device were employed. In the sulfur filtering operation, the majority of the redox solution, filtrate, is removed and returned to the process, as shown at 8. The solid sulfur that remains after the filtrate is removed is referred to as sulfur cake or filter cake, and is shown at 5. In some applications, clean water, as shown at 7, is sprayed over the filter cake to achieve a better separation between the sulfur cake and the redox solution. This operation is called "washing." The solid sulfur 5, along with some redox solution and possibly wash water, enters a reslurry tank 6. As shown at 10, water is added to the reslurry tank 6, to create a sulfur slurry that is passed through a sulfur melter or heat exchanger 12. The filter/wash/reslurry system shown in 4, 6, and 10 helps to remove metallic ions, such as iron and vanadium and reactive solutes, from the slurry, which in turn will reduce the amount of undesirable polysulfides formed in the melting process. Some systems do not employ the filter/wash/reslurry process, thus slurry from the process 2 goes directly to the sulfur melter 12.

In the prior art sulfur melter 12, the sulfur slurry is heated, by indirect heat exchange with either steam or a hot heat transfer fluid, to a temperature above the melting point of sulfur. Thus, the sulfur melts, and a hot solution exiting the sulfur melter 12 contains aqueous redox solution or reslurry water and molten sulfur. The molten sulfur is both immiscible in and denser than the redox solution or the reslurry water.

The hot solution, which is also referred to as melter effluent, then enters a vessel or sulfur separator 14 via an inlet 16. Inside the sulfur separator 14, the denser, molten sulfur droplets separate by gravity from the less dense redox solution or reslurry water, and the denser molten sulfur droplets fall to the bottom of the sulfur separator 14, as depicted in the area 18. The denser molten sulfur and the redox solution or reslurry water form an interface, as depicted by the line 36.

The molten sulfur flows from the bottom of the sulfur separator 14 via an outlet 20. Pressure in the sulfur separator 14 is controlled by a pressure control valve 24, which controls the flow of reslurry water from the sulfur separator 14 to prevent the water from boiling. The reslurry water that flows from the sulfur separator 14 via an outlet 22 is either returned to the reslurry tank 6, or directed to disposal. In an application in which the filter/wash/reslurry system is not employed, the liquid leaving the top of the sulfur separator will be redox solution in which case the solution will be returned to the unit. Molten sulfur recovered from the system is shown at 29.

The flow of molten sulfur out of the sulfur separator 14, through the outlet 20 is controlled by an automatic control valve 28, which is typically a steam jacketed, plug valve. The control valve 28 is controlled by an interface level control unit 30 that indirectly measures the level of molten sulfur within the separator 14 by measuring the differential pressure between two elevation points 32 and 34, which are above and below an intended interface level 36, respectively. In this type of level control scheme, the interface level control unit 30, is biased to zero when the separator is filled solely with redox solution. As the molten sulfur enters the separator, it will settle to the bottom, and the interface level 36 will increase until it is between elevation points 32 and 34, at which time a differential pressure will be measured by the interface level control unit 30 since the molten sulfur is more dense than the redox solution. As the interface level 36 rises, the differential pressure, as measured by the interface level control unit 30, will increase, and conversely, as the level 36 decreases, the differential pressure will decrease.

Although there are different methods of measuring and controlling the interface level 36, the method described above has proven to be the most reliable due to the physical properties of the molten sulfur. Another unique characteristic of most interface level control units in this type of service is that the interface level is controlled between two predetermined setpoints (differential gap) rather than at one constant level. In this type of control scheme, the control valve 28 remains closed until the interface level 36 reaches the top predetermined setpoint, at which time it opens to a preset opening. It then remains open until the interface level drops to the lower predetermined setpoint, at which time the control valve 28 closes. Although a modulating interface level control is possible, the differential gap control is generally dictated by the available sizes of steam jacketed, plug valves 28. These valves are not made in small sizes; consequently, they are generally too large to yield good modulating control. A major disadvantage of the prior art sulfur separator 14, and differential gap, interface level control unit 30, is the inability of the system to decrease the residence time of the molten sulfur in the vessel or the interface area between the molten sulfur and the redox solution as the molten sulfur throughput decreases. Thus, the quality of the molten sulfur decreases as the sulfur throughput is decreased. The residence time of the molten sulfur in the separator is set by the throughput of sulfur and the volume of the separator occupied by the molten sulfur. Since the vessel 14 has a constant cross sectional area (interface area), and the height of the interface above the bottom of the vessel is generally fixed by the sensitivity of the interface level control instrument, the molten sulfur volume cannot be changed to any great degree. Consequently, the molten sulfur residence time increases as the molten sulfur throughput decreases, and the interface area remains constant.

Referring now to FIG. 2, illustrating one of many preferred embodiments of the invention, the apparatus includes a vessel or sulfur separator 40 that receives a sulfur melter effluent containing molten sulfur redox solution from the sulfur melter, shown at 12, via the inlet 16. The sulfur separator 40 includes an upper section or top part 42, a middle section or tapered part 44, and a lower section or bottom part 46. Both the lower section 46 and the upper section 42 are cylindrical, and the diameter of the upper section is greater than the diameter of the lower section 46. The middle section includes an inner wall 43 that is cone shaped or funnel shaped and angled to join the upper section 42 and the lower section 46. The diameter of the middle section thus decreases downwardly. As the diameter of the middle section 44 decreases, the cross-sectional area of the middle section 44 decreases.

After the melter effluent enters the sulfur separator 40, the denser sulfur droplets settle by gravity to the bottom of the sulfur separator 40, as shown at 48, while the less dense aqueous solution rises to the top portion 42 of the sulfur separator 40. Although the inlet 16 can be located anywhere in the vessel 40, it is optimally located where the sulfur separator 40 has a relatively large diameter. This reduces the upper velocity of the redox solution as the liquid is introduced in the sulfur separator 40, and permits the sulfur droplets to settle and agglomerate into larger droplets and eventually into a continuous molten sulfur phase at the bottom of the sulfur separator 40. The molten sulfur and liquid redox solution form an interface, shown by the dashed line 50. The interface 50 is formed at a vertical height or level as shown by 51.

Pressure in the sulfur separator 40 is controlled by a pressure control valve 47, which controls the flow of aqueous solution from the sulfur separator 40 and prevents the aqueous solution from boiling. Aqueous solution that flows from the sulfur separator 40 via an outlet 49 is returned to the unit or the reslurry tank, as shown at 53.

The system includes an interface level control mechanism 52 that can be any type of reliable control mechanism. The preferred mechanism measures the pressure differential in the sulfur separator 14 by measuring the pressure at a pressure sensor 54 and a pressure sensor 56. The pressure sensor 54 may be located in the top portion 42 or the middle portion 44 of the sulfur separator 40. The pressure sensor 56 may be located in the bottom portion 46 or the middle portion 44 of the sulfur separator 40. Preferably pressure sensor 54 would be located in the top portion 42, and the pressure sensor 56 would be located in the bottom portion 46.

The system also includes an outlet 61 through which molten sulfur flows from the sulfur separator 40, as depicted at 64. The flow rate of molten sulfur from the sulfur separator 40 defines a sulfur throughput. The amount of time between the introduction of the molten sulfur into the sulfur separator at the inlet 16 and the removal of the molten sulfur via the outlet 61 defines a residence time of the molten sulfur in the system. The flow rate of molten sulfur is controlled by an outlet valve 62, which is controlled by the interface level control mechanism 52. The interface level control mechanism 52 and the outlet valve 62 together form an outlet control mechanism or structure.

When the unit is operating at the design sulfur throughput, it is preferred to maintain the interface 50 near the top of the middle section 44. As the sulfur throughput decreases, the interface level 50 is lowered by adjusting the setpoint(s) of the interface level control mechanism 52. Since the interface level 50 is being controlled within the middle section 44 of the vessel, a small decrease in the height of the interface level will result in a relatively large decrease in the volume occupied by the molten sulfur due to the decreasing diameter of the vessel, which in turn reduces the interface cross-sectional area between the molten sulfur and the aqueous phase. Consequently, small decreases in the height of the interface 50 will result in relatively large decreases in the residence time and the contact area between the sulfur and aqueous phases, which will tend to improve sulfur quality.

An angle 58 of the middle portion 44 defines the slope of the inner wall 43, and this angle 58 may be modified in different sulfur separator designs. Similarly, the location of the pressure sensors 54 and 56 may also be modified in different sulfur separator designs. Furthermore, a vertical distance 60 of the middle portion 44 may also be modified in different sulfur separator designs to maintain adequate interface level control. The inner walls 43 may be angled to extend the entire length of the vessel 40.

The invention may also include variations of the sulfur separator 40 shape. In FIG. 3, the middle section of the sulfur separator is the shape of a standard ASME head. Thus, the slope of the middle section 68 of the sulfur separator is not linear. The sulfur separator depicted in FIGS. 2 and 3 is a vertical vessel, however, the separator can also be a horizontal vessel or a vessel angled between vertical and horizontal. The system may also be used with liquids other than redox solution, such as reslurry water. The system may also be used with liquids other than molten sulfur.

It is to be understood that the specific mechanisms and techniques that have been described are merely illustrative of preferred applications of the principles of the invention. Numerous modifications, additions and substitutions may be made to the methods and apparatus without departing from the true spirit and scope of the invention.

What is claimed:

1. A liquid separator system comprising, in combination:
   a vessel with a top part and a bottom part, said vessel having a larger diameter at said top part than at said bottom part, the diameter of said vessel downwardly decreasing from said top part to said bottom part thereby defining a tapered part of said vessel;
   an inlet for introducing a first liquid and a second liquid into said vessel, said second liquid more dense than said first liquid;
   an outlet near said bottom part of said vessel for allowing a flow of said second liquid from said vessel;
   an interface control structure constructed and arranged for sensing within said vessel an interface level between said first liquid and said second liquid and for controlling said flow from said outlet and for raising or lowering said interface level responsive to a respective increase or decrease in said flow.

2. A liquid separator system as claimed in claim 1 wherein said first liquid is redox solution or reslurry water from a redox operation and said second liquid is molten sulfur.

3. A liquid separator system as claimed in claim 2 wherein said top part of said vessel is cylindrical and said bottom part of said vessel is cylindrical.

4. A liquid separator system as claimed in claim 3 wherein said interface level is maintained within said tapered part of said vessel.

5. A liquid separator system as claimed in claim 4 wherein a residence time of said second liquid in said vessel does not increase as said flow from said outlet decreases.

6. A sulfur separator system for separating sulfur from a mixture containing a first liquid and a second liquid comprising in combination:
   a vessel having a cylindrical upper section of a first diameter, a cone-shaped middle section, and a cylindrical lower section of a second diameter less than said first diameter, said upper section coupled to said middle section, said middle section coupled to said lower section, the diameter of said middle section downwardly decreasing from said first diameter to said second diameter;
   an inlet coupled to said vessel for introduction of said mixture into said vessel, said mixture forming an interface between said first liquid and said second liquid within said vessel at a vertical level;
   an outlet coupled to said vessel for removal of a flow of said second liquid from said vessel, said flow defining a sulfur throughput; and
   an interface control constructed and arranged for sensing said vertical level of said interface and for raising or lowering said interface level responsive to a respective increase or decrease in said sulfur throughput.

7. A sulfur separator system as claimed in claim 6 wherein said first liquid is redox solution and said second liquid is molten sulfur.

8. A sulfur separator system as claimed in claim 6 wherein said first liquid is reslurry water and said second liquid is molten sulfur.

9. A sulfur separator system as claimed in claim 6 wherein said inlet is coupled to said upper section of said vessel and said outlet is coupled to said lower section of said vessel.

10. A sulfur separator system as claimed in claim 6 wherein said inlet is coupled to said middle section of said vessel and said outlet is coupled to said middle section of said vessel.

11. A sulfur separator system as claimed in claim 10 wherein a residence time of said molten sulfur in said vessel does not increase as said sulfur throughput decreases.

12. A sulfur separator system for separating sulfur from a liquid, said liquid including a redox solution or reslurry water and a denser molten sulfur, comprising in combination:

a vessel having an inner wall, said inner wall including an inwardly sloping portion so that the cross sectional area of said vessel downwardly decreases;

an inlet coupled to said vessel for introduction of said liquid into said vessel, said molten sulfur sinking in said vessel and forming at a vertical height an interface with said redox solution or said reslurry water, said vertical height corresponding to the quantity of molten sulfur in said liquid, said interface having a surface area corresponding to the cross section area of said vessel at said vertical height;

an outlet coupled to said vessel for removal of said molten sulfur from said vessel; and an outlet control mechanism constructed and arranged for controlling a flow of said molten sulfur through said outlet, said flow of said molten sulfur defining a sulfur throughput and for raising or lowering said vertical height of said interface in response to a respective increase or decrease in said sulfur throughput.

13. A sulfur separator system as claimed in claim 12 wherein said outlet control mechanism comprises a outlet valve and an interface control mechanism, said interface control mechanism sensing said vertical height of said interface within said vessel and controlling said outlet valve.

14. A sulfur separator system as claimed in claim 13 wherein said inner wall defines a tapered portion of said vessel, said outlet control mechanism maintaining said interface within said tapered portion of said vessel.

15. A sulfur separator system as claimed in claim 14 wherein said vessel is cylindrical and said cross section corresponds to the area of a circle.

16. A sulfur separator system as claimed in claim 15 wherein said liquid is effluent from a sulfur melter.

17. A sulfur separator system as claimed in claim 16 wherein a residence time of molten sulfur in said vessel remains relatively constant in response to changing sulfur throughput.

18. A sulfur separator system as claimed in claim 17 wherein said inner wall slopes linearly.

19. A sulfur separator system as claimed in claim 18 wherein said outlet control mechanism raises said vertical height of said interface in response to an increase in said throughput.

20. A method of separating molten sulfur from a fluid, comprising the steps, in combination, of:

introducing a liquid comprising said fluid and said molten sulfur into a vessel, said molten sulfur sinking in said vessel and forming an interface with said fluid at a vertical height;

removing molten sulfur from said vessel; and altering said vertical height of said interface in response to the rate of removal of said molten sulfur from said vessel.

21. A method as claimed in claim 20 wherein said fluid is liquid redox solution or reslurry water.

22. A method as claimed in claim 21 wherein a residence time of said molten sulfur in said vessel remains relatively constant in response to changes in said rate of removal of said molten sulfur from said vessel.

23. A method as claimed in claim 20 wherein said vessel includes sloping walls defining a decreasing diameter range of said vessel, said vertical height remaining within said decreasing diameter range.

* * * * *